United States Patent [19]

Goers

[11] Patent Number: 4,705,252
[45] Date of Patent: Nov. 10, 1987

[54] X, Y, Z POSITIONER

[75] Inventor: George F. Goers, Tracy, Calif.

[73] Assignee: The United States of America as represented by the Department of Energy, Washington, D.C.

[21] Appl. No.: 894,523

[22] Filed: Aug. 8, 1986

[51] Int. Cl.[4] ............................................. F16M 11/04
[52] U.S. Cl. ............................... 248/178; 33/DIG. 8; 74/570; 350/247; 350/255; 350/530
[58] Field of Search ............... 248/178, DIG. 13, 661, 248/466, 469, 475.1, 179, 177, 176, 183, 184; 33/DIG. 8, 1 M; 350/247, 255, 530, 531; 74/479, 107, 570, 571 L, 571 M, 571

[56] References Cited

U.S. PATENT DOCUMENTS

| | | | |
|---|---|---|---|
| 242,100 | 5/1881 | Barnes | 74/571 L |
| 3,402,621 | 9/1968 | Johnson | 74/571 |
| 3,566,101 | 2/1971 | Hagner | 248/466 |
| 3,857,345 | 12/1974 | Higgins | 74/571 M |
| 4,226,392 | 10/1980 | Healy | 248/178 |
| 4,613,105 | 9/1986 | Genequand et al. | 248/178 |

Primary Examiner—Machado Reinaldo P.
Assistant Examiner—A. Chin-Shue
Attorney, Agent, or Firm—P. Martin Simpson, Jr.; L. E. Carnahan; Judson R. Hightower

[57] ABSTRACT

A three-axis control for precisely and conveniently adjusting items such as mirrors and lenses is disclosed. The adjuster apparatus includes a vertical stack of three rotatable adjusters. Rotation of the first effects vertical translation, whereas the second and third are eccentric assemblies which interact to effect movement along two angled axes perpendicular to the vertical axis.

11 Claims, 13 Drawing Figures

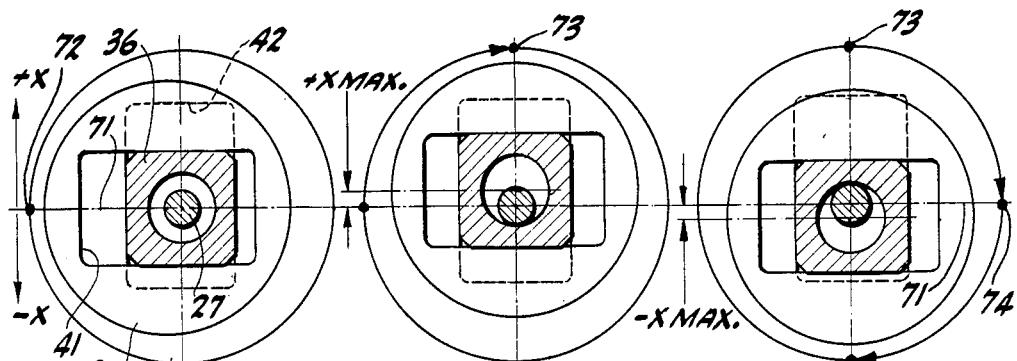
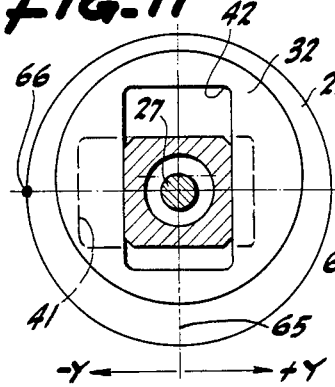
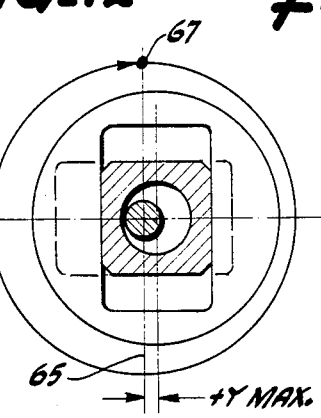
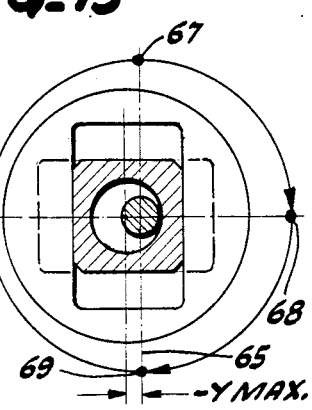
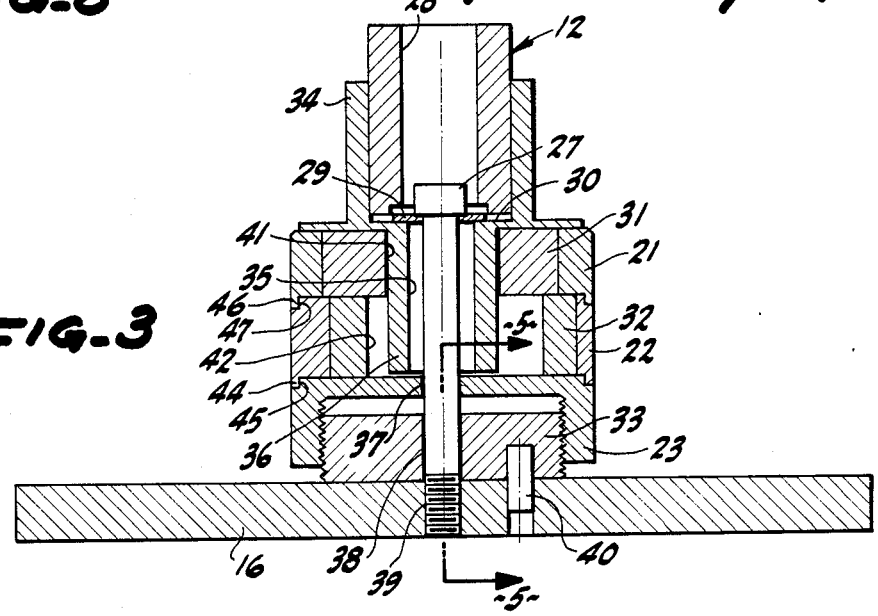

X, Y, Z POSITIONER

FIELD OF THE INVENTION

The United States Government has rights in this invention pursuant to Contract No. W-7405-ENG-48 between the United States Department of Energy and the University of California for operation under Lawrence Livermore National Laboratory.

BACKGROUND OF THE INVENTION

The present disclosure relates to position adjuster apparatus and, in particular, to control apparatus for adjusting an article system such as a lens mount or mirror mount in x, y and z coordinates.

For purposes of illustration, the present invention is described with respect to the precise positioning of optical system components such as mirrors or lens of the type used with precision optical apparatus such as laser systems. However, the present invention is applicable in general to systems which require or would benefit from precise, convenient positioning and position adjustment in the x, y and/or z coordinates.

The controlled propagation of laser beams necessarily requires quite accurate adjustments in the position of the mirrors and lenses which are used to control the path and beam optics. Adjuster systems are available which provide the required accuracy and positioning and adjusting positions but typically are bulky, complex and expensive. The complexity of such systems further introduces problems in the overall adjustment because of backlash.

There are also available adjuster systems which utilize micrometer-type techniques. These are based upon differential motion in which the difference in thread sizes achieves a differential pushing motion. However, micrometers were originally designed for measuring, not for adjustment, which typically requires greater amounts of force than does measuring. By design, such micrometers are inherently limited with respect to the application of the relatively large forces that are required for component mirror and lens mount adjustment in precision optical applications such as laser systems.

SUMMARY OF THE INVENTION

It is an object of the present disclosure to provide for an improved widely useful x, y, z position adjustment apparatus.

It is a further object to provide an improved x, y, z position adjustment apparatus which provides highly precise adjustments to x, y, z coordinates.

It is still another object to provide an improved x, y, z position adjustment apparatus which is compact in design and easy to use.

The x, y, z adjustment apparatus includes (1) a base; (2) a mount, such as for a lens or mirror, which itself includes a rectangular shaft; and (3) first and second, x and y adjusters, each comprising an eccentric having an elongated slot for receiving the rectangular shaft. The width of the slot is chosen to provide a close sliding fit with the shaft, whereas the length of the slot is longer than the shaft to permit reciprocal movement of the slot along the shaft. Each adjuster also includes a collar, preferably mounted on the eccentric, so that rotation of the respective x and y collars is translated into reversible linear motion of the shaft and associated mount in x and y directions within the same plane.

The system includes a third adjuster or a jack assembly comprising a jack screw which is mounted to a base and a jack housing which is threaded on the jack screw and supports the first and second adjusters. Rotation of the jack housing is translated into reversible linear movement of the three adjusters and the shaft and associated mount along the axis perpendicular to the plane of the first and second adjusters.

Preferably, the shaft is square or rectangular and the two adjuster slots are oriented thereon at right angles to one another so that the three adjusters control movement along three mutually orthogonal axes. However, other axes orientations can be used. Also, other polygonal cross-section shaft profiles and associated axis orientations can be used. For example, a shaft of hexagonal cross-section can be used in conjunction with a stack of two collars, whose eccentric slots and associated axes of movement are oriented at 60° angles.

The foregoing description of the present embodiments of the invention has been presented for purposes of illustration and description. It is not intended to be exhaustive or limit the invention to the precise form disclosed, for many modifications and variations are possible in light of the above and following teachings. For instance, the invention is not limited to the use of a square or rectangular shaft nor to orthogonal axes of movement of the two eccentric adjusters. For example, as mentioned, other shaft polygonal profiles such as hexagons can be used and, in general, various angular orientations of the shaft sides and of the axis movement can be used, limited only by the requirement that the opposite sides of the shaft be parallel to permit movement of the associated eccentric. The objects and advantages of the invention may be realized and attained by means of the instrumentalities and combinations which are pointed out in the appended claims.

BRIEF DESCRIPTION OF THE DRAWINGS

The foregoing disclosure is shown in detail by the drawings.

FIG. 3 depicts a vertical cross-section of the position apparatus of FIG. 1 taken along lines 3—3.

FIG. 8, 9 and 10 and FIGS. 11, 12 and 13 schematically depict the operation, respectively, of the y-adjuster and the x-adjuster apparatus of FIG. 1.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
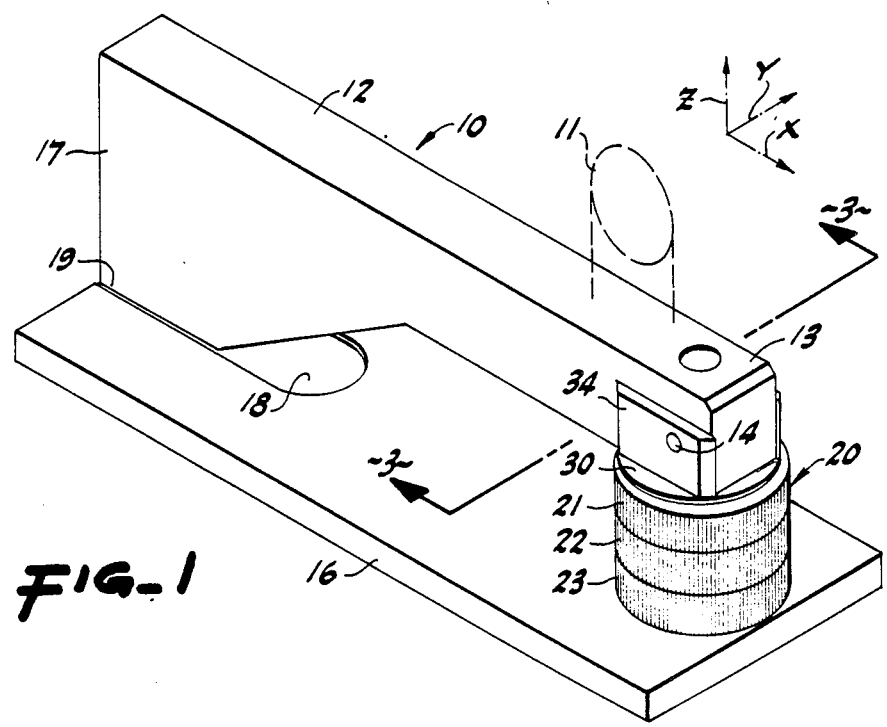
FIG. 1 is a perspective view of an improved x, y, z positioned apparatus according to my present invention.

FIG. 1 is a perspective view of one application 10 of an x, y, z positioned system which incorporates my present invention.

In the exemplary application 10, the positioner system mounts a lens or mirror 11 near one end 13 of arm 12 for imparting reciprocal movement to the lens along mutually perpendicular x, y and z axes. The arm end 13 is pivotally mounted at 14 to a single x, y, z positioner unit or assembly 20 which is mounted on base 16. The enlarged opposite end 17 of the arm 12 closely fits and rides along a slot 18 formed in the base. The base 16 can be part of the optical or lens system or can be separately mounted to that system. That is, the x, y, z positioner system can be an integral part of the overall optical system or can be a separate, portable unit. The primary use of the x, y, z positioner unit 20 is to make very fine, cotnrolled adjustments to the (x, y, z) position of a system or object such as the lens 11.

The x, y, z positioner unit 20 comprises a vertical stack of three individually rotatable adjusters which, for reference purposes, are termed the upper or x-adjuster collar 21, the lower or y-adjuster collar 22 and the z-adjuster jack housing 23. Reversible rotation of the x-adjuster collar 21, or rotation through an arc greater than 90° from the origin, imparts reversible x-direction translation to the arm 12 and lens 11. In addition, rotation in the same direction through 360° translates the arm 12 and lens 11 through a complete displacement cycle which includes $+x_{max}$ and $-x_{max}$. Similar rotation of the y-adjuster collar 22 imparts reversible y-direction translation to the arm 12 and lens 11.

The reversible z-direction translation is provided by rotating the jack housing 23 in opposite directions.

In short, one or a combination of the three rotatable adjusters can be used to precisely position the arm and lens to the desired (x, y, z) coordinate.

Please note, while x-direciton movement is purely reciprocal translation which involves sliding the arm 12 within the slot 18, y-direction movement and the z-direction movement are accompanied by pivoting of the arm 12 at pivot point 19 near the enlarged end 17. However, the resulting alsight curved component to the y-movement and z-movement does not detract significantly from the very precise adjustments which can be made to the position of the lens 11 using the x, y, z positioner unit 20.

Figure 2:
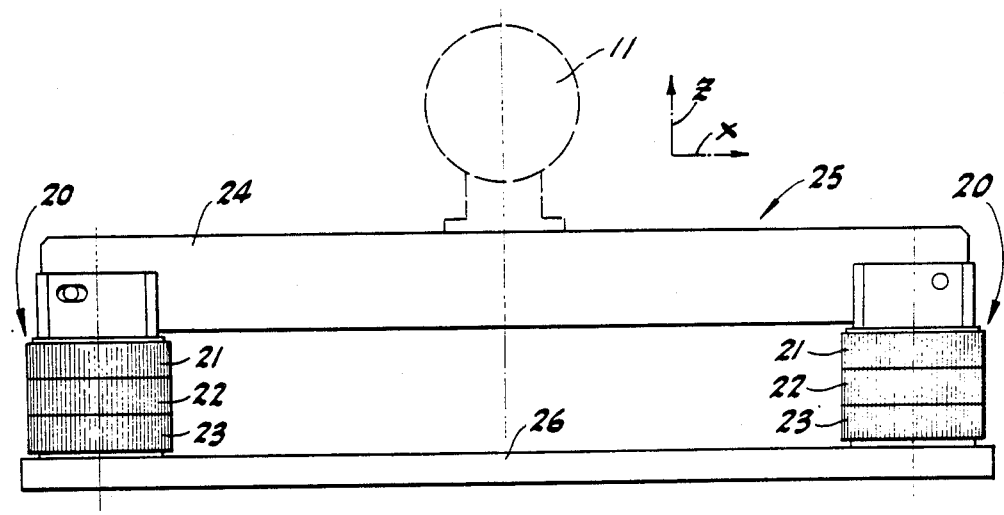
FIG. 2 is a front elevation view of an alternative application of my x, y, z positioner system employing two x, y, z positions which embody the present invention.

Furthermore, where it is desired to eliminate this small pivotal component of movement, the embodiment 25 of FIG. 2 can be used. The apparatus 25 incorporates an x, y, z positioner unit 20 at each end of arm 24 and uses a base 26 which need not be slotted. Precise non-pivotal y- or z-movement is imparted to the arm 24 and the lens 11 by rotating both of the y-adjuster collars 22—22 or the z-adjuster jack housings 23—23 through the same angluar displacement. In the case of x-direction travel, the collars 21—21 preferably are rotated in unisom through the same angle to prevent stressing the system; also, one mount may be slotted.

While the arm 24 can be fixedly mounted to the x, y, z positioner unit(s) 20, it is preferable to use a pivotal screw or pivot pin mounting such as 14 to permit the z-adjuster jack housings 23—23 to be adjusted separately without stressing the system.

The positioner units 20 can be readily adapted to mechanized operation in which both x-adjusters as well as both y- and/or both z-adjusters are operated, preferably in unisom, for example, by stepper motors which rotate the associated adjusters via belt or gear drive units.

Figure 4:
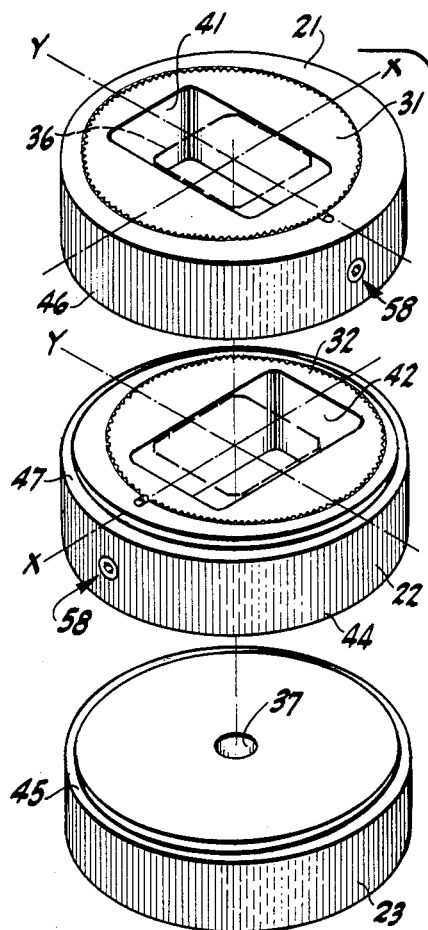
FIG. 4 is an exploded perspective view of the x, y, z positioner apparatus of the present invention.

FIGS. 3 and 4 are, respectively, a cross-sectional view and an exploded perspective view which together depict the presently preferred construction of my x, y, z positioner unit 20. Referring to FIGS. 3 and 4, each positioner unit 20 is held together by a locking screw 27. Access to the locking screw 27 is provided by hole 28 in arm 12. The locking screw 27 and the asociated washer 29 are seated against shoulder 30 of support and shaft member 34. The locking screw 27 is inserted through the washer 29 and the internal bore 35 of a rectangular shaft section 36 of support and shaft member 34 and through center holes 37 and 38 of the jack housing 23 and jack screw 33, and is threaded into the tapped bore 39 of the base 16 (or 26). The circular shoulder 30 of the support and shaft member is substantially co-extensive with the outer upper surface of the x-adjuster 21. As a consequence, securing the locking screw 27 to the base 16 and against the shoulder 30 holds the components of the positioner unit 20 together and secures the unit in the selected z-axis position.

The internally threaded jack housing 23 is mounted for reversible rotation on the mating, externally threaded jack screw 33. Also, the upper surface of the jack housing 23 supports the x- and y-adjusters as well as the support and shaft member 34. The jack screw 33 is secured to the base 16 against rotation by a pair of non-turn pins 40. As the result of this construction and mounting arrangement, reversible rotation of the jack housing 23 advances the jack housing, the x-adjuster, the y-adjuster and the mounting arm 12 upwardly and downwardly in the z-direction on the stationary jack screw 33.

To facilitate z-axis positioning, the locking screw 27 is retracted upward as required to permit upward adjustment of the positioner unit 20 and may be tightened after z-axis adjustment to secure the components of the x, y, z positioner unit and to maintain the precise x-axis position. Alternatively, where the system is not subject to vertical forces which might alter the z-positioning, a slight gap may be maintained between the locking screw 27 and the shoulder 30 to permit adjustment along the z-axis without first retracting the locking screw.

In still another alternative embodiment, resilient mounting means such as a pneumatic or hydrualic telescoping unit (not shown) can be used in place of the locking screw 27 to resiliently hold the adjuster components together, maintain the z-axis position, and allow adjustment of the z-axis position without adjustment of the mounting means itself.

Referring further to FIGS. 3 and 4, the y-adjuster collar 22 is rotatably mounted about an internal eccentric 32. Annular peripheral lip 44 of the adjuster collar 22 (FIG. 3) rides along peripheral recess or groove 45 of the jack housing 23. Also, the rectangular shaft 36 of the support and shaft member 34 closely fits within the relatively narrow width of the elongated rectangular slot 42 of eccentric 32. When the y-adjuster collar 22 is rotated, the shaft 36 prevents the eccentric 32 from rotating, and as described additionally regarding FIGS.

8-10, the eccentric 32 and the y-slot 42 thereof engage and move the shaft 36 back and forth, i.e., reversibly, along the length of elongated x-adjuster slot 41 in the horizontal y-direction.

Referring still further to FIGS. 3 and 4, upper, x-adjuster collar 21 and associated eccentric 31 are mounted and operated essentially identically to the y-adjuster collar 22 and eccentric 32. That is, the x-adjuster collar 21 has a circumferential peripheral lip 46 (FIG. 3) which rides along mating recess or groove 47 of the y-adjuster collar 23 for stability when the adjuster collar 21 is rotated. The associated eccentric 31 is prevented from rotating by the rectangular shaft 36 which extends through the elongated rectangular eccentric slot 41 in eccentric 31. Referring also to FIGS. 11-13, the eccentric 31 is mounted with the length of its elongated slot 41 oriented perpendicular to the length of the y-adjuster collar 21 causes the eccentric 31 to move the shaft 36 along the length of the underlying y-adjuster slot 42, in the x-direction. This movement of the shaft 46, of course, also moves the lens-mounting arm 12 in the x-direction.

Figure 5:
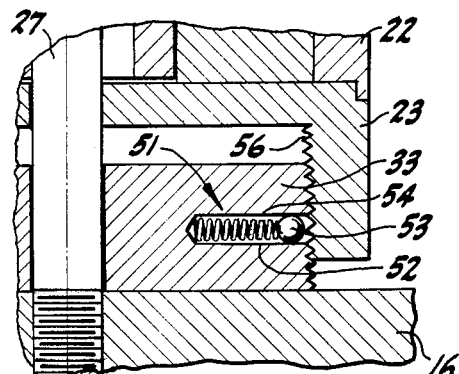
FIG. 5 depicts an enlarged partial, vertical cross-section taken along lines 5—5 in FIG. 3.

FIG. 5 is an enlarged, partial, vertical cross-section view of the jack housing 23 and jack screw 33 and surrounding structure illustrating a ball detent assembly 51 which prevents unwanted rotation of the jack housing 23. The ball detent assembly 51 is located within a radial bore 52 formed within the jack screw 33 and comprises a friction ball 53 and a compression spring 54 which forces the ball lightly against the internal threads 56 of the jack housing 23. As will be readily understood, this frictional engagement of the ball 53 with the threads 56 provides a low value frictional threshold which must be overcome to rotate the jack housing 23, and thus, maintains the selected position of the jack housing on the jack screw, but does not interfere with rotational adjustment of the jack housing.

Figure 6:
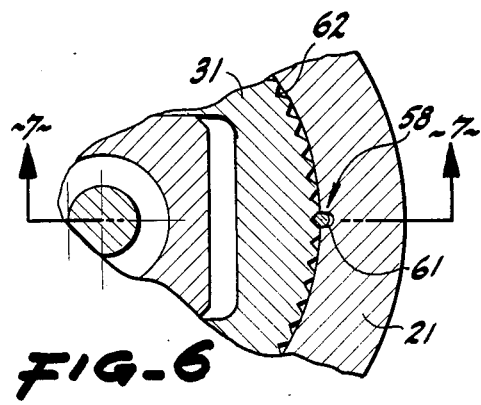
FIG. 6 depicts a partial enlarged plan view of the apparatus of FIG. 1.
Figure 7:
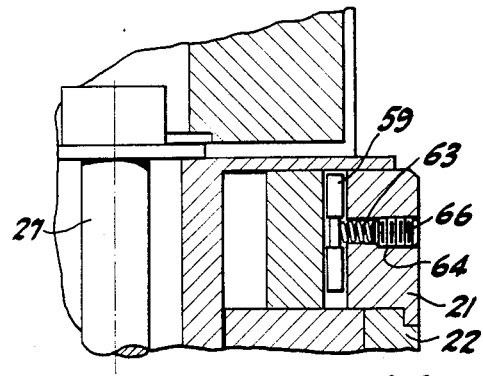
FIG. 7 depicts an enlarged, partial vertical cross-section taken along lines 7—7 in FIG. 6.

FIG. 6 is an enlarged, partial plan view of the x-adjuster extending in horizontal section through the shaft 36, and showing index pin assembly 58 for the x-adjuster. FIG. 7 is an enlarged partial vertical cross-section of the x-adjuster collar 21, also illustrating an index pin assembly 58. The index pin assembly 58 comprises a cylindrical generally dumbbell or barbell shaped index pin 59 which fits within an axial groove 61 in the x-adjuster collar and mates with marginal teeth or notches 62 of the serrate periphery of the eccentric 31. A compression spring 63 is located within a smaller-diameter section of a stepped radial bore 64 in the collar 21 and engages the reduced diameter middle fo theindex pn 59 and biases the pin against the teeth 62 of the eccentric 31. The biasing force provided by the spring 63 is adjusted by set screw 66.

As best illustrated in FIG. 6, the compression spring 63 lightly forces the index pin 59 against the serrate periphery of the eccentric 31 and provides a low value frictional threshold which must be overcome to rotate the x-adjuster collar 21 and, thus, maintains the selected position of the x-adjuster collar but does not interfere with the rotational adjustment of that collar.

A second index pin assembly 58 is incorporated between the y-adjuster collar 22 and the y-eccentric 32. This second pin assembly operates exactly as described above regarding the x-adjuster collar 21 to maintain the position of the y-adjuster collar 22 on the y-eccentric 32, yet permit ready rotation of the y-collar and associated adjustment of the y-axis position of the arm 12 and the lens 11.

The operation of the y-adjuster collar 22 is depicted in FIGS. 8, 9 and 10. In FIG. 8, the eccentric 32 is at the "home" position in which the center 65 of the shaft 36 is located at the y-axis origin (y=0). As shown in FIG. 9, 90° clockwise (CW) rotation of the collar 22, indicated by arc 66–67, causes the eccentric slot 42 to move the shaft 36 along x-slot 41 to the extreme plus y position, $+y_{max}$. An additional 90° CW rotation (arc 67–68, FIG. 10; 180° CW total) moves the shaft 36 back to the y-origin. Still another 90° CW rotation (arc 68–69; 270° CW total) moves the shaft 36 to the extreme −y position, $-y_{max}$. See FIG. 10. Finally, complete 360° CW rotation returns the shaft to the y origin, FIG. 8. As is evident from the above, clockwise (counterclockwise) rotation of 90°, 180°, 270° and 360° moves the shaft 36, arm 12 and lens 11 to the $+y_{max}(-y_{max})$; 0 (O); $-y_{max}$ $(+y_{max})$; and 0 (O) y-coordinates.

FIGS. 11, 12 and 13 depict a similar adjustment sequence for the x-adjuster collar 21. Thus, FIG. 11 illustrates the home position of the shaft center line 71 at the x-origin. FIG. 12 illustrates the maximum $+x_{max}$ displacement associated with 90° clockwise (CW) rotation of collar 21 along arc 72–73. FIG. 13 depicts the maximum $-x_{max}$ displacement associated with an additional 180° of CW rotation of collar along arc 73–75. Thus, CW (CCW) rotation through 90°, 180°, 270° and 360° moves the shaft 36, arm 12 and lens 11 to $+x_{max}$ $(-x_{max})$; 0 (O); $-x_{max}$ $(+x_{max})$; 0 (O) x-coordinates.

The foregoing description of the preferred embodiment of the invention has been presented for purposes of illustration and description. It is not intended to be exhaustive or to limit the invention to the precise form disclosed and many modifications and variations are possible in light of the above teaching. For instance, the invention could utilize a shaft 36 of polygonal cross-section which is other than a square and two adjuster collars. Also, axis angles other than 90° or 60° can be used, limited only by the need to have parallel opposite shaft sides to permit movement along the associated eccentric slot. Thus, it should be obvious that the preferred embodiment was chosen and described in order to best explain the principles of the invention and its practical applications and to thereby enable others skilled in the art to best utilize the invention and various embodiments and with various modifications as are suited to the particular use contemplated. It is intended that the scope of the invention be defined only by the claims appended hereto.

What is claimed is:

1. A multiple axis position adjuster comprising mounting means including a shaft of polygonal cross-section; and at least first and second adjuster means mounted along said shaft; each adjuster means comprising an outer collar and an inner eccentric having an elongated slot for receiving the shaft; said slots being oriented at angles defined by the shaft cross-section so that rotation of a collar reversibly moves the associated eccentric and shaft along the slot of the other eccentric.

2. The position adjuster of claim 1 wherein the shaft is rectangular and the slots and respective shaft movements are oriented at right angles.

3. The position adjuster of claim 1 or 2, further comprising a third adjuster means mounted in seriatim with said first and second adjuster means along a common axis for reversibly moving the first and second means and the shaft along said common axis.

4. A three-axis, x, y, z position adjuster comprising a base;

mounting means including a hollow shaft of polygonal cross-section;

a stack of first, second and third adjuster means mounted in seriatim along the z-axis between the mounting means and the base for controlling movement of the mounting means along the x, y and z axes; and means for securing the mounting means and the three adjuster means to the base;

the first adjuster means comprising a circular jack screw fixedly supported on the base to prevent rotation, and a jack housing rotatably threaded on the periphery of the jack screw for rotation thereon to reversibly move the jack housing, the second and third adjuster means and the mounting means along the z-axis;

the second adjuster means comprising a first eccentric having a circular peripheral surface and a first elongated planar slot therein, and being mounted over the jack housing with the shaft extending through the first slot and aligning the length of the slot parallel to the x-axis for confining movement of the eccentric to movement along the y-axis; and a collar rotatably mounted about the eccentric; and the third adjuster means comprising a second eccentric having a circular periphery and a second elongated planar slot therein, the eccentric being mounted over the second adjuster means with the shaft extending through the second slot and aligning the length of the slot parallel to the y-axis for confining movement of the slot along the x-axis; and a second collar mounted for rotation about the periphery of the second eccentric;

the said mounting of the second and third adjuster means on the shaft translating rotation of the first and second collar into reversible movement of the first and the second eccentric, and the shaft and mounting means, along, respectively, y- and x-axes.

5. A three-axis, x, y, z position adjuster system comprising a base;

at least a pair of three-axis position adjusters, each adjuster comprising (a) mounting means including a hollow shaft of polygonal cross-section;

(b) a stack of x, y and z adjuster means mounted n seriatim along the z-axis between the mounting means and the base for controllingmovement of the mounting means along the x, y and z axes;

(c) means for securing the mounting means and the three adjuster means to the base;

(d) the z-adjuster means comprising a circular jack screw fixedly supported on the base to prevent rotation and a jack housig rotatably threaded on the periphery of the jack screw for rotationt hereon to reversibly move the jack housing, the second and third adjuster means and the mounting means along the z-axis;

(e) the y-adjuster means comprising a first eccentric having a circular peripheral surface and a first elongated planar slot therein, and being mounted over the jack housing with the shaft extending through the first slot and aligning the length of the slot parallel to the x-axis for confining movement of the eccentric to that along the y-axis; and a first collar rotatably mounted about the eccentric;

(f) the x-adjuster means comprising a second eccentric having a circular periphery and a second elongated planr slot therein, the eccentric being mounted over the y-adjuster means with the shaft extending through the second slot aligning the length of the slot parallel to the y-axis for confining movement of the slot along the x-axis; and a second collar mounted for rotation about the periphery of the second eccentric;

the said mounting of the x- and y-adjuster means on the shaft translating rotation of their collars into reversible movement, respectively, of the x- and y-eccentrics, and the shaft and mounting means, along the x-and y-axes; and mounting arm means extending between the mounting means of said three-axis positioners for mounting objects thereon for three-axis positioning responsive to the selected operation of the adjuster means.

6. The three-axis position adjuster system of claim 5, further comprising means for providing non-pivotal y- or z-movements by rotating pairs of said adjuster means in unison said pairs of adjuster means being selected from two jack housings, two first collars and two second collars.

7. The apparatus of claim 4 or 5 wherein the shaft is square for moving the two eccentrics along mutually perpendicular x- and z-axes.

8. The apparatus of claim 4 or 5 wherein the transverse cross-section of the shaft is an even-numbered polygon having parallel opposite sides for mounting at least one adjuster means.

9. The apparatus of claim 4 or 5 wherein each said jack housing and jack screw has a hole therein aligned along the common z-axis and wherein the securing means comprises a bolt extending through said hollow shaft and said holes for connecting the mounting means to said base.

10. The apparatus of claim 4 or 5 wherein the jack screw comprises a radial bore extending to the periphery thereof and further includes a ball detent positioned within the slot in frictional engagement with the inner peripheray of the jack housing for stabilizing the jack housing against unwanted rotation.

11. The apparatus of claim 4 or 5 wherein at least one of said collars includes a radial hole and an axial slot at the inner periphery intersecting the radial hole and wherein the associated eccentric comprises a serrate periphery and the position adjuster defined thereby further comprises a bar detent located in the axial slot for engaging the serrate edges of the outer periphery of the eccentric, a compression spring and a set screw within said hole for adjusting the frictional engagement of the bar detent with the serrate edges of the eccentric to stabilize the collar against unwanted rotation.

* * * * *